United States Patent
Zhang et al.

(10) Patent No.: US 7,292,930 B2
(45) Date of Patent: Nov. 6, 2007

(54) ATTENUATION OF ENGINE HARSHNESS DURING LEAN-TO-RICH TRANSITIONS

(75) Inventors: Guoqing Zhang, Lisle, IL (US); Justin M. O'Connor, Batavia, IL (US); Michael J. Miller, Mount Prospect, IL (US); Xinqun Gui, Naperville, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/672,580

(22) Filed: Feb. 8, 2007

(65) Prior Publication Data

US 2007/0129876 A1 Jun. 7, 2007

Related U.S. Application Data

(62) Division of application No. 10/702,889, filed on Nov. 6, 2003, now Pat. No. 7,191,591.

(51) Int. Cl.
*F02D 41/00* (2006.01)

(52) U.S. Cl. .................................. 701/109; 60/274

(58) Field of Classification Search ................ 701/109, 701/108, 102, 115, 103, 104, 105; 60/274, 60/276, 285; 123/480, 443, 568.21
See application file for complete search history.

(56) References Cited

U.S. PATENT DOCUMENTS

| | | | |
|---|---|---|---|
| 6,931,837 B2* | 8/2005 | Verkiel et al. | 60/274 |
| 6,990,951 B1* | 1/2006 | Liu et al. | 701/103 |
| 7,191,591 B2* | 3/2007 | Zhang et al. | 60/285 |

FOREIGN PATENT DOCUMENTS

DE  101 35 954 A1 *  3/2002

* cited by examiner

*Primary Examiner*—Hieu T. Vo
(74) *Attorney, Agent, or Firm*—Jeffrey P. Calfa; Gerald W. Askew

(57) ABSTRACT

Engine systems and methods for accomplishing regeneration of a NOx adsorber (28) using in-cylinder post-injection in a way that creates a lean-rich transition (FIG. 3) for regenerating the NOx adsorber while attenuating engine torque output fluctuations during the transition without the necessity of using torque sensing to attenuate the fluctuations.

6 Claims, 4 Drawing Sheets

ATTENUATION OF ENGINE HARSHNESS
DURING LEAN-TO-RICH TRANSITIONS

This application is a division of application Ser. No. 10/702,889, filed Nov. 6, 2003 now U.S. Pat. No. 7,191,591.

FIELD OF THE INVENTION

This invention relates to motor vehicles that are powered by internal combustion engines whose operation may for any of various reasons temporarily transition from running lean to running rich, one reason being to purge a NOx adsorber in the engine exhaust system of adsorbed NOx so that it can continue to be effective as the engine continues running. More particularly, the invention relates to systems and methods for attenuating fluctuations in engine output torque that contribute to harness in the operation of such vehicles during lean-rich transitions such as those for regenerating a NOx adsorber.

BACKGROUND OF THE INVENTION

An exhaust system of a diesel engine that comprises a NOx adsorber is capable of adsorbing significant amounts of NOx in exhaust gas passing through the exhaust system from the engine, thereby reducing the amount of NOx that otherwise would enter the atmosphere. From time to time, such a device must be regenerated in order to purge it of adsorbed NOx so that it can continue to be effective in adsorbing NOx as the engine continues to run. A known technique for regenerating a NOx adsorber comprises creating an excess of CO for reaction with adsorbed NOx to reduce the NOx to molecular nitrogen ($N_2$) while the CO oxidizes to $CO_2$ during the process.

One known method for creating excess CO comprises injecting fuel in proper amount into the exhaust leaving engine combustion chambers. Because that fuel does not contribute to the thermal energy of combustion that is converted by thermodynamic processes in the combustion chambers acting on the engine's kinematic mechanism to create engine torque, it has essentially no influence on engine torque.

For one or more reasons, post-injection of fuel that does contribute to the thermal energy of combustion that produces engine torque may be considered a more desirable alternative, although both methods require the injection of extra fuel to purge the NOx adsorber. However, the post-injection alternative has consequences on engine torque output that can lead to undesirable torque fluctuations that contribute to engine and vehicle harshness as the engine continues to run during NOx adsorber regeneration.

A known electronic engine control system comprises a processor-based engine controller that processes data from various sources to develop control data for controlling certain functions of the engine. The amount and the timing of engine fueling are two functions that are controlled by an engine control system. A typical diesel engine that comprises fuel injectors for injecting fuel into the engine cylinders under control of an engine control system controls both the duration and the timing of each fuel injection to set both the amount and the timing of engine fueling. During an engine cycle, it is also capable of pre-injection of fuel (pilot-injection) in advance of a main injection and post-injection after the main injection, although the use of either typically depends on how the engine is being operated.

SUMMARY OF THE INVENTION

The present invention relates to engine systems and methods for accomplishing regeneration of a NOx adsorber using in-cylinder post-injection in a way that creates a lean-rich transition for regenerating the NOx adsorber while attenuating engine torque output fluctuations during the transition without the necessity of using torque sensing to attenuate the fluctuations.

Accordingly, one generic aspect of the present invention relates to a method for control of output torque developed by an internal combustion engine during lean-rich modulation of engine operation. With the engine running lean, data values of certain parameters are processed to develop a data value for desired engine fueling for causing the engine to develop a corresponding desired output torque at a given engine speed.

As the engine operation changes from running lean to ruing rich, engine output torque is maintained substantially at the corresponding desired output torque at the given engine speed by processing i) the data value for desired engine fueling resulting from the processing of certain parameters, ii) a data value for engine speed, and iii) a data value for actual air-fuel ratio at which the engine is operating, to thereby develop a data value for desired engine fueling for causing the engine to run rich while striving to maintain engine output torque at the corresponding desired output torque at the given engine speed when the engine was running lean.

Another generic aspect relates to an engine incorporating a control strategy for implementing the foregoing generic method.

Still another generic aspect relates to a method for regenerating a NOx adsorber in an exhaust system of an internal combustion engine that is fueled in accordance with a data value for desired engine fueling. The method comprises processing data values of certain parameters to develop a data value for desired engine fueling for causing the engine to develop a corresponding desired output torque without conditioning engine exhaust passing into the exhaust system for NOx adsorber regeneration.

Data values of various parameters indicative of conditions relevant to initiation of NOx adsorber regeneration are processed and after that processing has disclosed that NOx adsorber regeneration can be initiated, NOx adsorber regeneration is initiated by changing engine fueling so as to condition engine exhaust passing into the exhaust system for regenerating the NOx adsorber.

The method develops a data value for desired engine fueling that is effective to condition the exhaust gas for NOx adsorber regeneration at a given engine speed while striving to maintain the output torque at the corresponding output torque that desired engine fueling would develop at the given engine speed without conditioning engine exhaust passing into the exhaust system for NOx adsorber regeneration. This is accomplished by processing data values for i) the desired engine fueling that would develop that corresponding output torque without conditioning engine exhaust passing into the exhaust system for NOx adsorber regeneration, ii) engine speed, and iii) actual air-fuel ratio at which the engine is operating.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
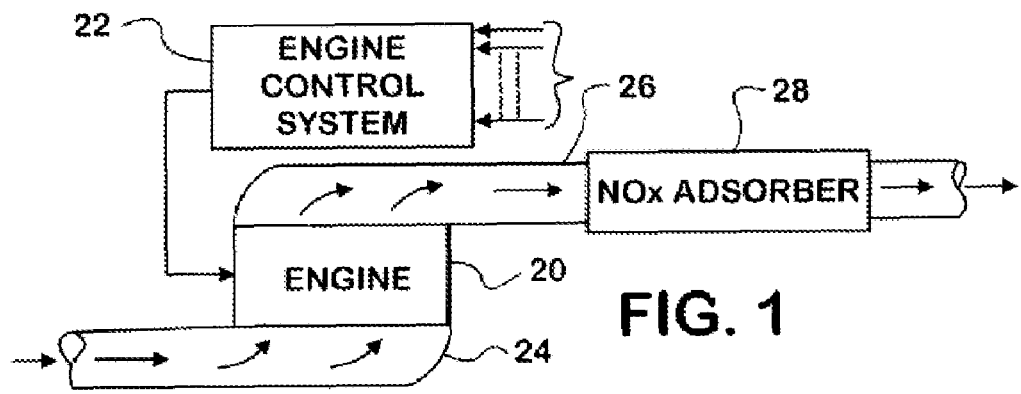
FIG. 1 is a general schematic diagram of portions of a diesel engine relevant to the present invention.

FIG. 1 shows a schematic diagram of an exemplary diesel engine 20 for powering a motor vehicle. Engine 20 has a processor-based engine control system 22 that processes data from various sources to develop various control data for controlling various aspects of engine operation. The data processed by control system 22 may originate at external sources, such as sensors, and/or be generated internally.

Control system 22 controls the operation of electric-actuated fuel injectors that inject fuel into engine combustion chambers. A processor of control system 22 can process data sufficiently fast to calculate, in real time, the timing and duration of injector actuation to set both the timing and the amount of fueling. The injection process comprises a main injection, and under certain conditions, a pilot injection and/or a post-injection. Control system 22 calculates a data value VF_des_m that represents the amount of fuel that is to be injected into a combustion chamber during an engine cycle.

Engine 20 flier comprises an intake system 24 through which charge air enters the combustion chambers, and an exhaust system 26 through which exhaust gases resulting from combustion leave the engine. Exhaust system 26 includes a NOx adsorber 28 that adsorbs significant amounts of NOx in exhaust gas passing from engine 26, thereby reducing the amount of NOx that otherwise would enter the atmosphere.

From time to time, NOx adsorber 28 must be regenerated in order to purge it of adsorbed NOx so that it can remain effective as the engine continues to run. A known technique for regenerating a NOx adsorber comprises creating an excess of CO for reaction with adsorbed NOx to reduce the NOx to molecular nitrogen ($N_2$) while the CO oxidizes to $CO_2$ during the process.

Figure 2:
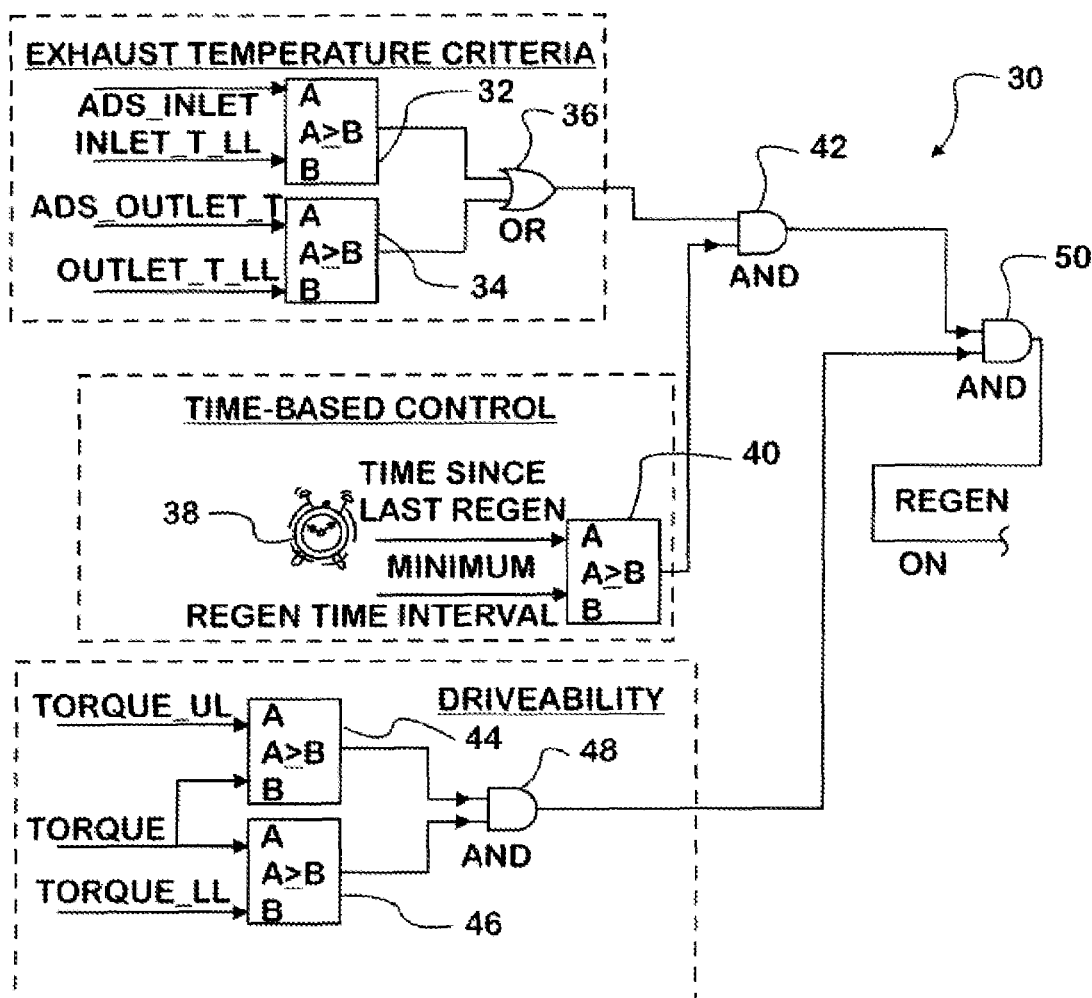
FIG. 2 is a schematic diagram of a portion of control strategy for the engine.

FIG. 2 discloses a strategy 30 that is executed by control system 22 to determine when regeneration can be performed. The strategy is premised on the general factors: exhaust gas temperature; elapse of time since the previous regeneration; and driveability of the vehicle.

Temperature of exhaust gas proximate the inlet of NOx adsorber 28, obtained by either estimation or measurement, is represented by the data value for a parameter ADS_INLET_T. Temperature of exhaust gas proximate the outlet of NOx adsorber 28, obtained by either estimation or measurement, is represented by the data value for a parameter ADS_OUTLET_T. The data value for ADS_INLET_T is compared by a comparison function 32 with a data value INLET_T_LL representing a lower temperature limit at or above which it would be appropriate to regenerate NOx adsorber 28. The data value for ADS_OUTLET_T is compared by a comparison function 34 with a data value OUTLET_T_LL representing a lower temperature limit at or above which it would be appropriate to regenerate NOx adsorber 28.

If either comparison function 32, 34 is satisfied by the corresponding actual temperature being equal to or greater than the respective lower limit, then a logical OR function 36 enables regeneration to proceed. Additional conditions must also be satisfied however before regeneration actually proceeds.

Time elapsed since the last regeneration is measured by a timer function 38. The data value for elapsed time is compared by a comparison function 40 with the data value for a minimum interval between regenerations. Once elapsed time equals or exceeds the minimum, regeneration is enabled. An AND logic function 42 assures that both a temperature minimum and a time minimum have been satisfied before regeneration is enabled.

Once strategy 30 has been enabled, actual regeneration becomes a function of driveability. Driveability refers to acceptable vehicle vibration and harshness during lean/rich transition. A torque lower limit and upper limit have been set to minimize vibration and harshness during the transition. The lower limit requires the engine to be running with some load, while the upper limit keeps the engine away from severe acceleration conditions.

The data value for a parameter TORQUE represents the torque which engine 20 is producing. TORQUE is the estimated torque based on fueling and engine speed, in other words TORQUE=f(VFDES, N). The data value for TORQUE is compared by a comparison unction 44 with a data value TORQUE_UL representing an upper torque limit above which regeneration would be inappropriate. The data value for TORQUE is compared by a comparison function 46 with a data value TORQUE_LL representing a lower torque limit below which regeneration would be inappropriate. An AND logic function 48 processes the results of both comparisons to assure that torque is within the allowable range for NOx adsorber regeneration.

A further AND function 50 processes outputs from both AND functions 42, 48 to allow regeneration when the three general factors of exhaust gas temperature, elapse of time since the previous regeneration, and driveability of the vehicle are satisfied.

Figure 3:
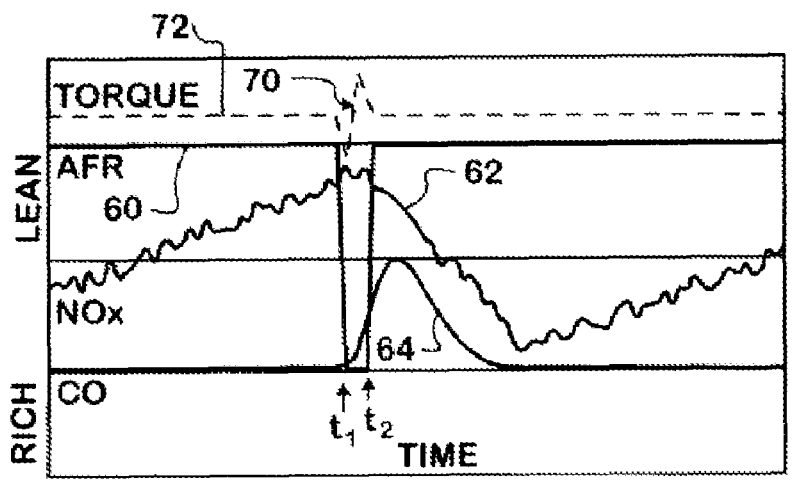
FIG. 3 is a graph plot showing time traces of several parameters relevant to engine operation.

In general, a diesel engine runs cooler, slower, and leaner than a spark-ignition engine. During lean running, engine 20 generates NOx that is adsorbed by NOx adsorber 28. When the adsorber is to be regenerated, engine operation transitions from running lean to running rich in order to condition the exhaust for purging NOx adsorber 28 by generating the needed excess CO. A trace 60 in FIG. 3 represents air-fuel ratio. Before time $t_1$ engine 20 is running lean, the NOx loading of NOx adsorber 28, represented by a trace 62, is increasing, and CO concentration, represented by a trace 64, is relatively low.

At time $t_1$ post injection and air management decrease the air-fuel ratio, creating a surge in CO concentration in the process. At time $t_2$ lean running resumes. Trace 62 shows that the surge is effective to purge NOx adsorber 28 of a significant amount of its NOx load.

The conditions portrayed by FIG. 3 assume that certain inputs to control system 22, namely engine speed and accelerator pedal position are commanding engine 20 to develop a substantially constant torque. Because the regeneration process alters engine fueling from that which is otherwise being called for by engine speed and accelerator pedal position, engine torque may fluctuate during NOx adsorber regeneration, as represented by a perturbation 70 in a trace of engine torque 72. A significant perturbation can contribute to harshness in engine operation that is consequently introduced into the vehicle drivetrain. It is toward attenuating such harshness that the present invention is directed.

Figure 4:
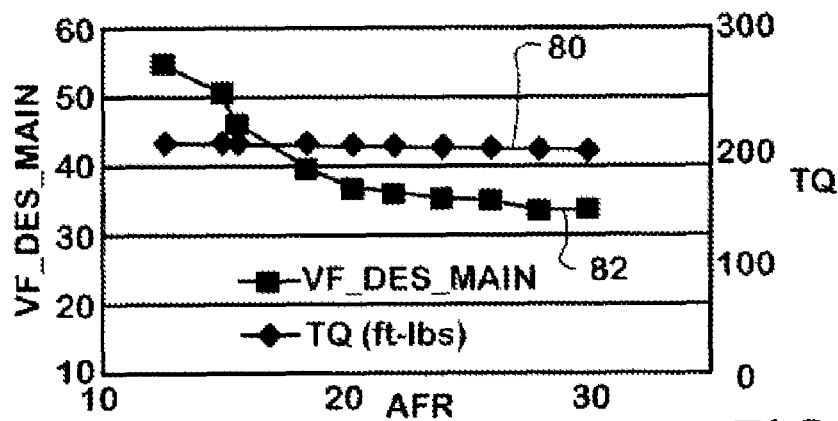
FIG. 4 is a first graph plot useful in understanding principles of the invention.

FIG. 4 shows a trace 80 of engine torque versus air-fuel ratio where, for a given engine speed, the torque remains substantially constant. A trace 82 shows the corresponding fueling that engine 20 needs in order to develop the torque represented by trace 80.

Principles of the invention resulted from the recognition that data closely approximating trace 82 can be developed by suitable data programming of, and data processing by, control system 22, and the resulting data processed with other data to create desired engine fueling data that, for a given engine speed and desired engine output torque, can fuel the engine during a lean-to-rich transition that causes the engine to run rich while striving to maintain engine output torque at the corresponding desired output torque at the given engine speed when the engine was running lean, thereby attenuating undesired fluctuations in engine torque that would be experienced in the absence of the invention.

Figure 5:
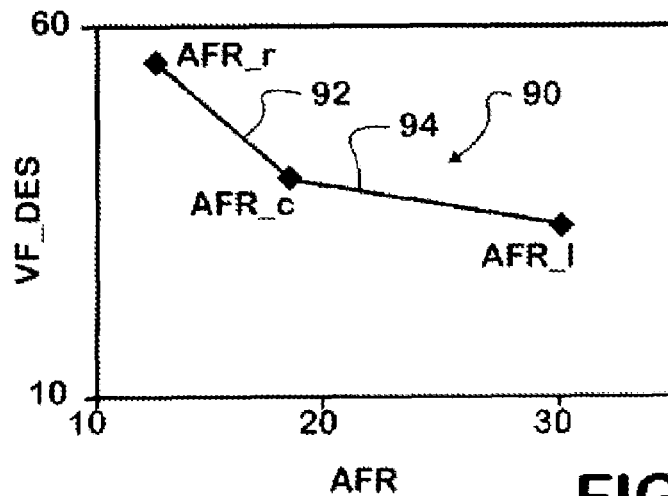
FIG. 5 is a second graph plot useful in understanding principles of the invention.

FIG. 5 shows a piecewise linear approximation 90 of trace 82 to comprise a first linear segment 92 extending between data points marked AFR_r and AFR_c and a second linear segment 94 extending between data points marked AFR_c and AFR_l. AFR symbolizes air-fuel ratio.

Segment 92 can be defined by the function $$VF\_des\_m = \alpha VF\_des\_m\_c + (1-\alpha) VF\_des\_m\_r$$

and segment 94 by the function $$VF\_des\_m = \beta VF\_des\_m\_l + (1-\beta) VF\_des\_m\_c$$

where $$\alpha = (AFR - AFR\_r)/(AFR\_c - AFR\_r)$$

and $$\beta = (AFR - AFR\_c)/(AFR\_l - AFR\_c).$$

These functional relationships define a control algorithm for desired engine fueling over a range of air-fuel ratios that will cause engine 20 to develop substantially constant torque, although it is to be appreciated that the engine may not necessarily operate all such ratios. In order to generate the excess CO needed for NOx adsorber regeneration, engine 20 needs to run at an AFR below stoichiometric (an AFR of approximately 13). Hence for a given torque, a fueling transition from lean to rich that strives to maintain that torque will take place along segment 92. As can be appreciated, the specific parameters for a transition will be governed by a specific regeneration strategy for a particular engine.

Implementation of the control algorithm in control system 22 is accomplished by entering data values for AFR_r, AFR_c, and AFR_l for each pair of data values for engine torque and engine speed. A sufficient number of pairs of such torque and speed data values are programmed into control system 22 to adequately cover the range of engine operation with sufficient resolution within the range.

For given data values of torque and speed representing current engine torque and current engine speed, control system 22 operates to select from the closest pair of torque and speed data values that have been programmed into it, the corresponding data values for AFR_r, AFR_c, and AFR_l for use in calculating a data value for VF_des_m. A data value for the variable AFR is obtained in any suitably appropriate way and processed according to the algorithm to develop the data value for VF_des_m. The processing occurs sufficiently fast m real time to allow variables like AFR to be updated fast enough to follow changing engine operation.

Figure 7:
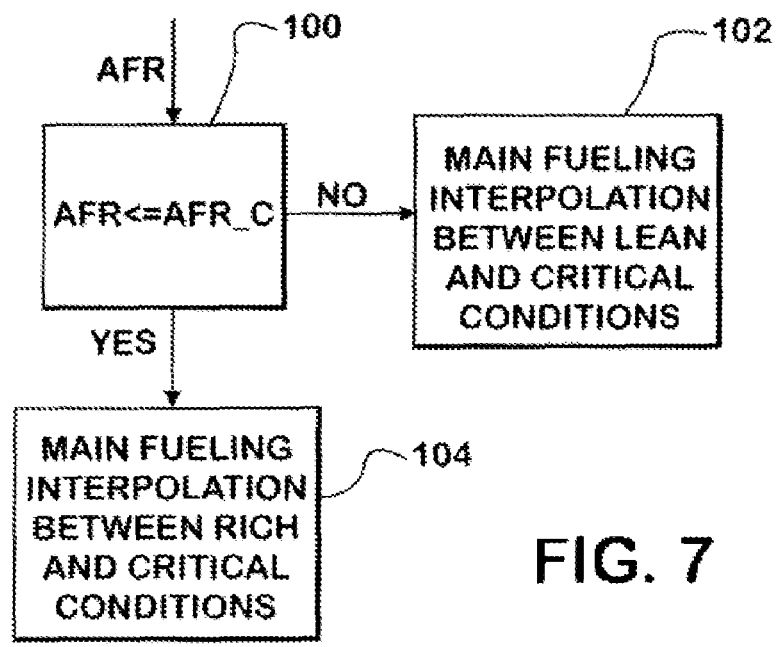
FIG. 7 is a schematic diagram of another portion of the engine control strategy.

The algorithm develops desired fueling data values in the manner represented by FIG. 7. For the selected pair of torque and speed data values, control system 22 determines whether actual AFR is above or below the AFR represented by the corresponding break point AFR_c (step 100 in FIG. 7).

If AFR is greater than AFR_c, then desired fueling is controlled by $$VF\_des\_m = \beta VF\_des\_m\_l + (1-\beta) VF\_des\_m\_c$$

corresponding to step 102 in FIG. 7.

If AFR is equal to or less than AFR_c, then desired fueling is controlled by $$VF\_des\_m = \alpha VF\_des\_m\_c + (1-\alpha) VF\_des\_m\_r$$

corresponding to step 104 in FIG. 7.

Figure 8:
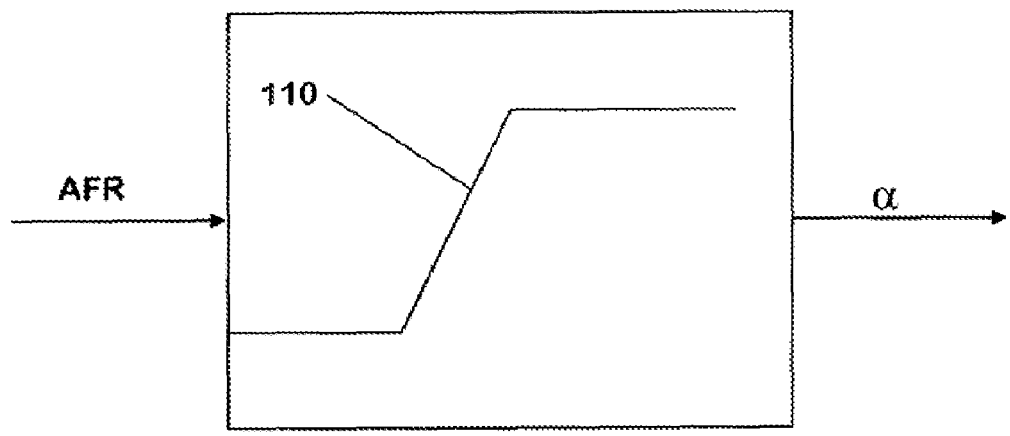
FIG. 8 is a third graph plot useful in understanding principles of the invention.
Figure 9:
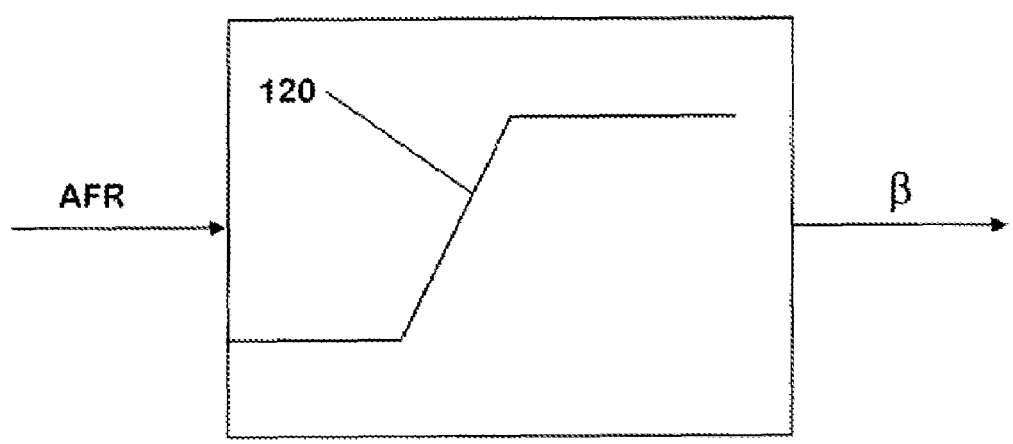
FIG. 9 is a fourth graph plot useful in understanding principles of the invention.
Figure 6:
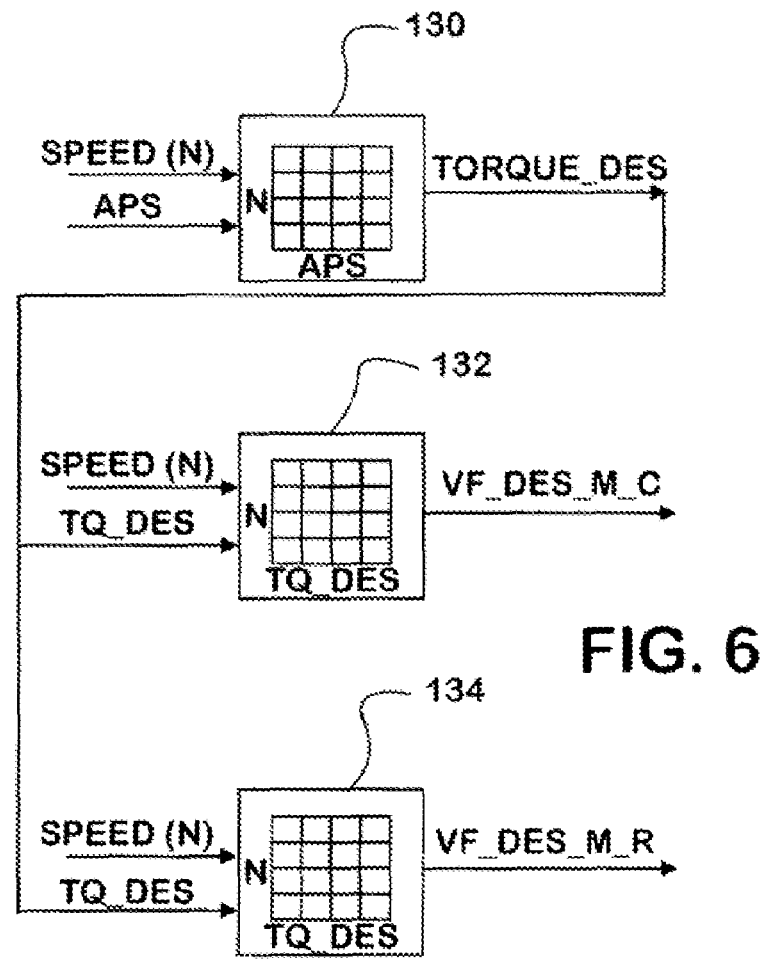
FIG. 6 is a schematic diagram of another portion of the engine control strategy.

When the actual AFR is other than AFR_r, AFR_c, and AFR_l, the algorithm calculates the data value for desired engine fueling by what amounts to interpolation, as graphically portrayed by the function 110 in FIG. 8 for α, and the function 120 in FIG. 9 for β. The implementation in control system 22 is represented by FIG. 6.

Data values for engine speed (parameter N) and accelerator pedal position (parameter APS) determine, via a map or look-up table 130, a data value for engine output torque (parameter Torque_des). Control system 22 processes Torque_des according to an operating strategy for causing engine 20 to develop that torque at that speed. When NOx adsorber 28 is not being regenerated, it is Torque_des that controls desired engine fueling by a different portion of the strategy that is not shown here. When regeneration is occurring, Torque_des is still a factor in controlling desired engine fueling, but not the sole factor because the control algorithm that is used during regeneration takes AFR into account.

Another look-up table 132 contains data values for VF_des_c correlated with the pair of the data value for engine speed (N) and the data value for Torque_des that would be essentially exclusively controlling desired engine fueling if regeneration were not occurring. Still another look-up table 134 contains data values for VF_des_r correlated with the pair of the data value for engine speed (N) and the data value for Torque_des that would be essentially exclusively con trolling desired engine fueling if regeneration were not occurring.

Data values for N and Torque_des determine, via maps 132 and 134, data values for VF_des_m_c (representing desired fueling when AFR=AFR_c) and VF_des_m_r (representing desired fueling when AFR=AFR_r). The control algorithm then utilizes those data values for its calculation. Because data values for N and Torque_des can change during regeneration the execution rate of the control algorithm is sufficiently fast to follow whose changes so that data values for VF_des_m_c and VF_des_m_r can be changed accordingly as called for by the maps.

While a presently preferred embodiment of the invention has been illustrated and described, it should be appreciated that principles of the invention apply to all embodiments falling within the scope of the following claims.

What is claimed is:

1. An internal combustion engine comprising:
   a fueling system for fueling the engine in accordance with a data value for desired engine fueling; and
   a control system for processing various data to develop data for control of various engine functions including data values for desired engine fueling, wherein the control system comprises a control strategy
   a) for causing the engine to run lean, and with the engine running lean, for processing data values of certain parameters to develop a data value for desired engine fueling for causing the engine to develop a corresponding desired output torque at a given engine speed; and
   b) for causing the engine to transition from running lean to running rich while striving to maintain engine output torque at the corresponding desired output torque at the given engine speed by processing i) the data value for desired engine fueling resulting from the processing of a), ii) a data value for engine speed, and iii) a data value for actual air-fuel ratio at which the engine is operating, to thereby develop a data value for desired engine fueling that causes the engine to run rich while striving to maintain engine output torque at the corresponding desired output torque at the given engine speed when the engine was running lean.

2. An engine as set forth in claim 1 in which the portion of the control strategy for causing the engine to transition from running lean to running rich while striving to maintain engine output torque at the corresponding desired output torque at the given engine speed by processing i) the data value for desired engine fueling resulting from the processing of a), ii) a data value for engine speed, and iii) a data value for actual air-fuel ratio at which the engine is operating, to thereby develop a data value for desired engine fueling that causes the engine to run rich while striving to maintain engine output torque at the corresponding desired output torque at the given engine speed when the engine was running lean, comprises:
   with the engine running rich, processing a data value for actual air-fuel ratio through a function that correlates data values of air-fuel ratio to data values of engine fueling for causing the engine to run rich while striving to maintain engine output torque at the corresponding desired output torque at the given engine speed when the engine was running lean, and causing the data value of desired engine fueling to be the data value of engine fueling correlated by the function to the data value of actual air-fuel ratio.

3. An engine as set forth in claim 1 in which the portion of the control strategy for causing the engine to run lean, and with the engine running lean, for processing data values of certain parameters to develop a data value for desired engine fueling for causing the engine to develop a corresponding desired output torque at a given engine speed, comprises:
   with the engine running lean, processing data values of engine speed and accelerator pedal position to develop a data value for desired engine fueling for causing the engine to develop a corresponding desired output torque at a given engine speed.

4. A method for control of output torque developed by an internal combustion engine during lean-rich modulation of engine operation, the method comprising:
   a) with the engine running lean, processing data values of certain parameters to develop a data value for desired engine fueling for causing the engine to develop a corresponding desired output torque at a given engine speed;
   b) causing the engine to transition from running lean to running rich while striving to maintain engine output torque at the corresponding desired output torque at the given engine speed by processing i) the data value for desired engine fueling resulting from the processing of step a), ii) a data value for engine speed, and iii) a data value for actual air-fuel ratio at which the engine is operating, to thereby develop a data value for desired engine fueling that causes the engine to run rich while striving to maintain engine output torque at the corresponding desired output torque at the given engine speed when the engine was running lean.

5. A method as set forth in claim 4 in which step b) comprises:
   with the engine running rich, processing a data value for actual air-fuel ratio through a function that correlates data values of air-fuel ratio to data values of engine fueling for causing the engine to run rich while striving to maintain engine output torque at the corresponding desired output torque at the given engine speed when the engine was running lean, and causing the data value of desired engine fueling to be the data value of engine fueling correlated by the function to the data value of actual air-fuel ratio.

6. A method as set forth in claim 4 wherein step a) comprises:
   with the engine running lean, processing data values of engine speed and accelerator pedal position to develop a data value for desired engine fueling for causing the engine to develop a corresponding desired output torque at a given engine speed.

* * * * *